United States Patent [19]

Simard

[11] Patent Number: 4,521,822

[45] Date of Patent: Jun. 4, 1985

[54] CURRENT TRANSFORMER PROTECTION DEVICE

[75] Inventor: Julien Simard, Brossard, Canada

[73] Assignee: Hydro-Quebec, Montreal, Canada

[21] Appl. No.: 509,384

[22] Filed: Jun. 30, 1983

Related U.S. Application Data

[63] Continuation-in-part of Ser. No. 283,966, Jul. 16, 1981, abandoned.

[30] Foreign Application Priority Data

Mar. 3, 1981 [CA] Canada ............................ 372141

[51] Int. Cl.³ ............................................. H02H 7/04
[52] U.S. Cl. ............................................ 361/35; 315/74; 315/75; 315/125; 361/56; 361/91
[58] Field of Search .................... 361/35, 38, 56, 91, 361/187; 315/70, 74, 75, 91, 119, 122, 125, 127

[56] References Cited

U.S. PATENT DOCUMENTS 2,305,096 12/1942 McDermott ........................ 315/91

FOREIGN PATENT DOCUMENTS

| 922851 | 6/1947 | France ............................ 361/91 |
| 1178783 | 5/1959 | France ............................ 361/35 |
| 1559860 | 2/1969 | France ............................ 361/35 |
| 618101 | 2/1949 | United Kingdom .............. 361/91 |
| 468331 | 5/1975 | U.S.S.R. ........................... 361/35 |
| 678576 | 8/1979 | U.S.S.R. ........................... 361/56 |

Primary Examiner—Harry E. Moose, Jr.
Attorney, Agent, or Firm—Oblon, Fisher, Spivak, McClelland & Maier

[57] ABSTRACT

A protection system for protecting the secondary windings of current transformers against overvoltages. The protection system consists of a device shunting the secondary winding and having a triggering device operative when the winding is subjected to a voltage higher than the voltage appearing across the terminals of the secondary winding, under normal operating conditions and during a fault on the HV power network. The shunting device comprises a latching relay incorporating a coil which is energized by the triggering device to short-circuit the current secondary transformer through the relay contact, and, also, a voltage regulator connected in parallel with the relay coil. This protection system is simple, compact, lightweight and consumes no energy when the current transformer operates under normal conditions.

5 Claims, 2 Drawing Figures

CURRENT TRANSFORMER PROTECTION DEVICE

This is a continuation-in-part application of U.S. patent application Ser. No. 06/283,966 filed July 16, 1981 entitled CURRENT TRANSFORMER PROTECTION DEVICE, now abandoned.

BACKGROUND OF THE INVENTION (a) Field of the Invention

The present invention deals with the protection of current transformers by shunting their secondary windings and, more particularly, to a protection circuit for guarding the secondary windings of current transformers against overvoltages appearing across the terminals of such secondary winding, said protection system being connected in shunt with the secondary winding of a current transformer.

(b) Description of Prior Art

The continuously growing demand for electrical energy has given rise to the design and use of current transformers which are overdimensioned and of a high turns ratio. However, in operation, such transformers present a definite risk, particularly when a circuit connected to the secondary winding accidentally opens, causing large overvoltages across the terminals of the secondary. Although the current transformers now available have been designed and dimensioned so as not to reach magnetic-core saturation in the worst cases of transient current waves, since in practice the saturation voltage cannot be reached, it nevertheless occurs that the opening of a circuit on the secondary side produces an electric arc at a point in the external circuit located between the transformer secondary winding and the opening point, where the dielectric strength of the circuit is weakest. That arc is a powerful one, since its voltage is maintained constant through each application of the alternating current. This presents high risks to maintenance or repair personnel working on such secondary circuits and, furthermore, it may heavily damage the equipment related to said secondary circuit.

A device currently exists which is capable of preventing to some extent the above-mentioned risks by reducing to a safe level the overvoltages appearing across the secondary terminals of current transformers. Said device incorporates a high-power varistor mounted on a copper plate connected to a transformer secondary winding, the temperature rise of which is controlled by a thermostat which short-circuits the secondary winding to limit the varistor to a maximum temperature when the permanent fault occurs in the secondary circuit. However, this device has the disadvantage of being cumbersome, heavy and relatively costly and it generates a substantial amount of heat, therefore requiring additional cooling systems. Such drawbacks have heavily restricted the use of this type of apparatus with current transformers.

A feature of the present invention is that it is light and compact, and costs substantially less than known devices. Moreover, a substantial advantage of the protection system of the present invention is that it does not generate any heat under normal operating conditions of current transformers as well as during the occurrence of faults. Therefore, the protection system of the present invention avoids the inconveniences and drawbacks of the devices known to data, while keeping the voltages present in the secondary circuit of current transformers at a safe level.

SUMMARY OF INVENTION

In broad terms, the present invention provides a system for protecting the secondary winding of an HV current transformer of a power network against overvoltages caused by an open circuit. The system comprises a shunting device for short-circuiting the secondary winding. A triggering device, acting as a crowbar, is operative when subjected to a voltage higher than the voltage appearing across the terminals of the secondary winding in normal operating conditions and during a fault on the HV power network. The device is connected in series with a voltage regulator, acting as a clamp and energizing the shunting device, connected in parallel therewith, to short-circuit the secondary winding of the current transformer.

BRIEF DESCRIPTION OF THE DRAWINGS

A preferred embodiment of the present invention is described below with reference to the accompanying drawings wherein.

DESCRIPTION OF PREFERRED EMBODIMENTS

Figure 1:
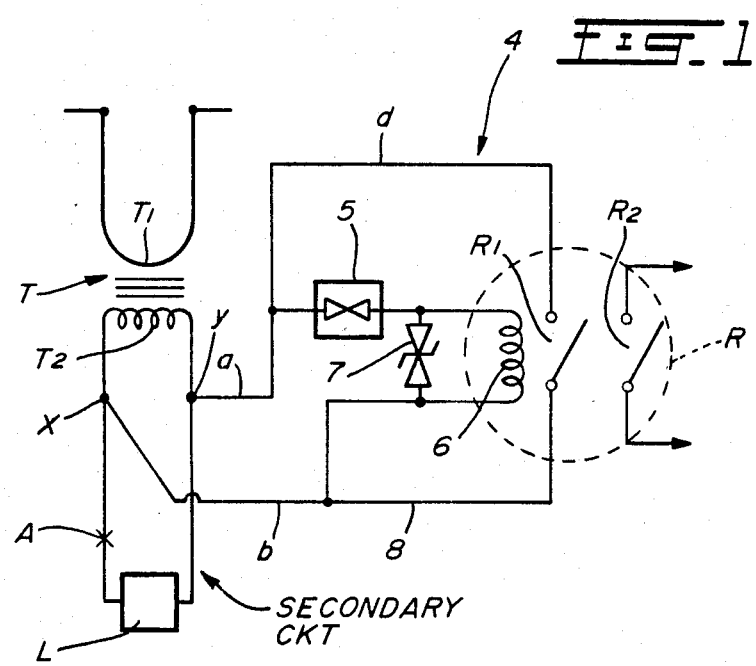
FIG. 1 illustrates a schematic diagram and connections of the protection system according to the present invention.

Referring to FIG. 1 there is shown at 4 the protective system of the present invention. The system comprises a triggering device 5 which is a spark gap of the gas type, acting or a crowbar, and connected in series with a coil 6 of a latching relay R. When an open secondary circuit occurs, the coil 6 is energized, the contact R1 of relay R is actuated to short-circuit the terminals X-Y of the secondary winding T2. For reliability, the spark gap 5 is so selected as to withstand several times the maximum current in the secondary transformer when subjected to its triggering voltage in the case of an open circuit at A. The triggering voltage is higher than the maximum voltage that could occur across the secondary terminals at fifteen times the nominal current through a high impedance load (differential protection). When the voltage threshold is reached, the spark gap 5 is fired and its impedance, which up to then was very high (about $10^{10}$ ohms), becomes almost nil in the time of approximately 0.1 millisecond. The voltage then appearing across the terminals of coil 6 and the two zener diodes 7, which are connected back-to-back is restricted by diodes 7 to a level which corresponds to about five times the nominal operating voltage of relay R. This voltage level is not excessive in view of the very short application period but it considerably speeds up the closing time of relay R. It should be noted that the zener diodes 7, acting as a clamp, serve as a voltage regulator for coil 6, ensuring constant supply to coil 6 irrespective of the steepness or values of current waves present in transformer T.

The relay selected in the present example is a mechanical latching type with a pushbutton reset. The two contacts R1 and R2 of the relay are "c" type designed to hold a nominal AC current of 10 amperes. Contact R2 is used with an audible and/or visual alarm device (not shown) to indicate the occurrence of an open circuit in the secondary circuit of the current transformer and to signal the actuation of the protection system P and that the transformer secondary has been short-circuited bringing the voltage level to zero.

The relay coil 6 is of a sensitive type, since the minimum current that flows through it cannot be higher than the product of the minimum HV network current value by the transformer turns ratio of the current transformer. For example, if the minimum current is 10% of the nominal HV network current and the transformer ratio is 4000/1, the current flowing in the secondary circuit will be 100 mA. This arrangement was found to be the most simple one that can guarantee consistent operation within a spread of secondary current from 0.1 A to 15 A or more; a dynamic range of over 150.

It should be noted that the total operating time of the current transformer protection device is about one quarter of a cycle at 60 Hz or about 4 mS. During tests performed on this protection system, no failure or defect was detected, despite the fact that the circuits were subjected to over one hundred times the number of operations normally expected during the normal service life of such a system.

Figure 2:
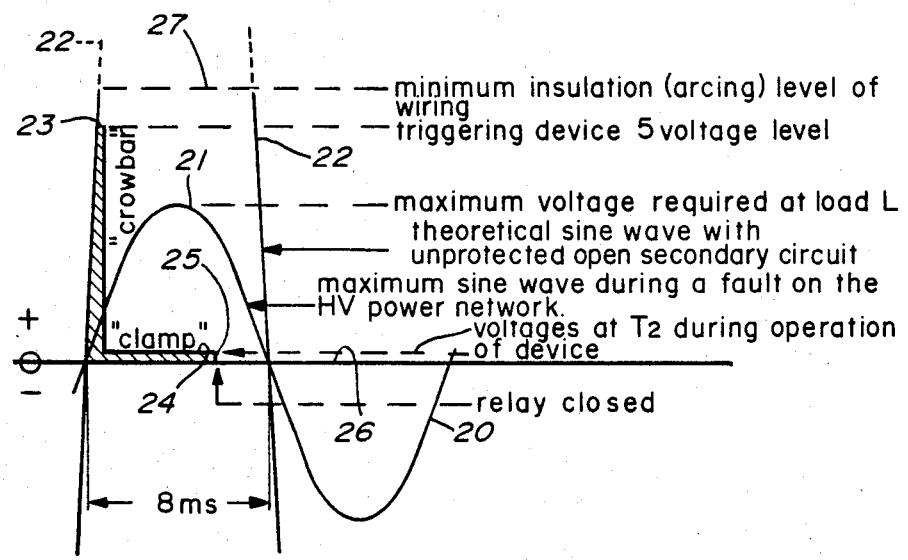
FIG. 2 shows the wave shapes appearing at the device terminals under operating conditions.

Referring now to FIG. 2 there is shown wave shapes illustrating the various conditions of the secondary circuit as seen by the protecting system. The wave shape 20 illustrates the maximum voltage sine wave present at the secondary terminals (X-Y -FIG. 1) when fault exists on the HV power network. Its maximum voltage level 21 is inferior to the trigger voltage of the triggering device 5. Accordingly, under normal operating conditions and during a fault on the HV power network, the protective system does not operate. The sine wave 22 represents the theoretical voltage wave that would appear across the secondary winding terminals X-Y if the secondary circuit was to be open. This is the damaging voltage that must be shunted to protect personnel and equipment. Before this voltage reaches its damaging level 27, it can be seen that at level 23 it will fire the triggering device 5 which acts as a crowbar thus instantly lowering the voltage to a very low level 24 which is the level chosen for the regulator device 7 acting as a clamp. During a few milliseconds, the regulating device 7 energizes the coil 6 of the relay R (the shunting device) which finally shunts the secondary winding at time interval 25 bringing the secondary winding voltage down to the zero level 26.

I claim:

1. A system for protecting the secondary winding of an HV current transformer of a power network against overvoltages caused by an open secondary circuit, said system comprising a shunting device of the mechanical latching type for short-circuiting said secondary winding, a triggering device acting as a crowbar and operative when subjected to a voltage higher than the voltage appearing across the terminals of said secondary winding in normal operating conditions and during a fault on the HV power network, said triggering device being connected in series with a voltage regulator acting as a clamp, and said shunting device being connected in parallel with said voltage regulator whereby said regulator will energize said shunting device to short-circuit said secondary winding of the current transformer.

2. A system as claimed in claim 1 wherein said triggering device is a spark gap element.

3. A system as claimed in claim 2 wherein said shunting device is a latching relay, said relay having a relay coil connected in parallel with said voltage regulator.

4. A system as claimed in claim 3 wherein said voltage regulator comprises two zener diodes connected back-to-back and ensure constant voltage supply to said coil irrespective of the current wave shapes in the transformer secondary circuit.

5. A system as claimed in claim 1 wherein said protective system is operative within a dynamic current range of over 150.

* * * * *